May 4, 1926.
J. J. WOMPEY
LIGHT REFLECTOR
Filed Jan. 12, 1924
1,583,216
2 Sheets-Sheet 1
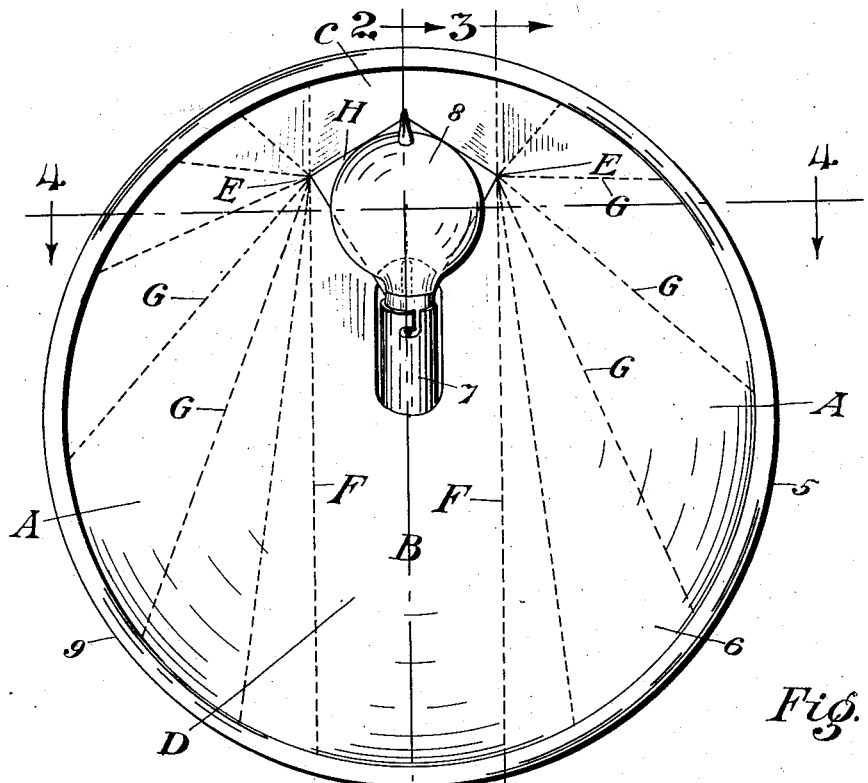
Fig. 1
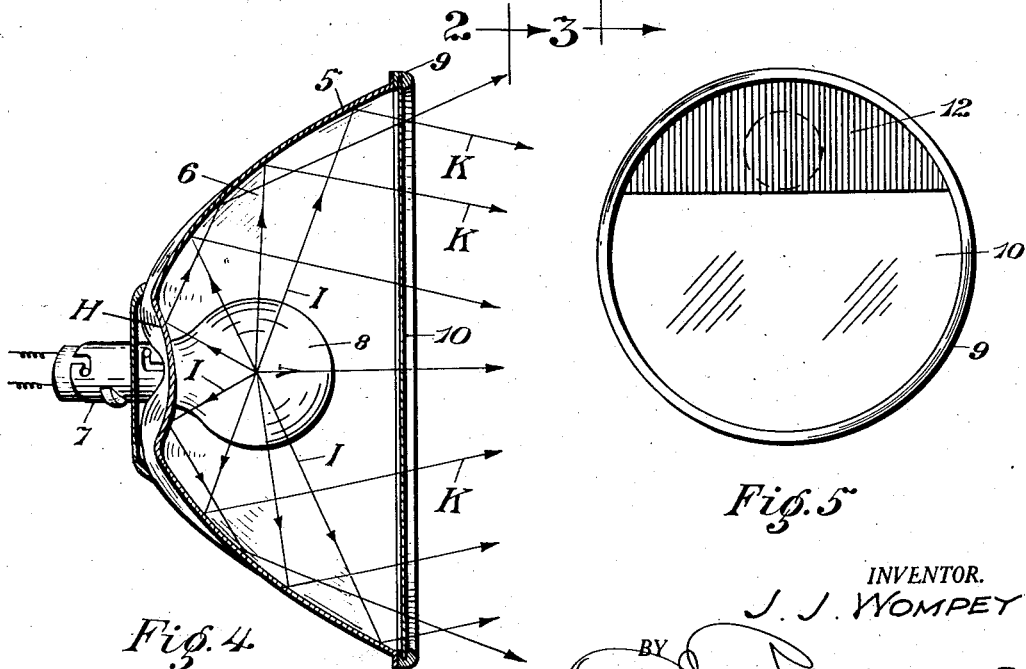
Fig. 4
Fig. 5
INVENTOR.
J. J. WOMPEY
BY
ATTORNEY.

May 4, 1926.
J. J. WOMPEY
LIGHT REFLECTOR
Filed Jan. 12, 1924
1,583,216
2 Sheets-Sheet 2
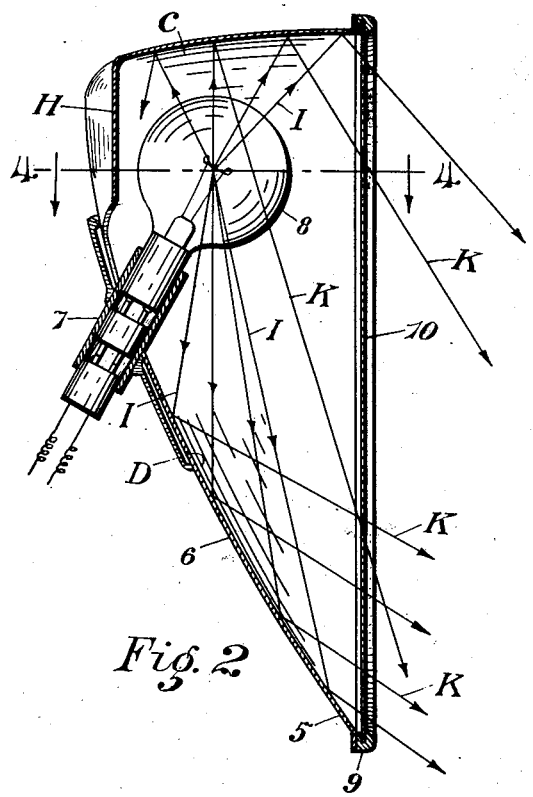
Fig. 2
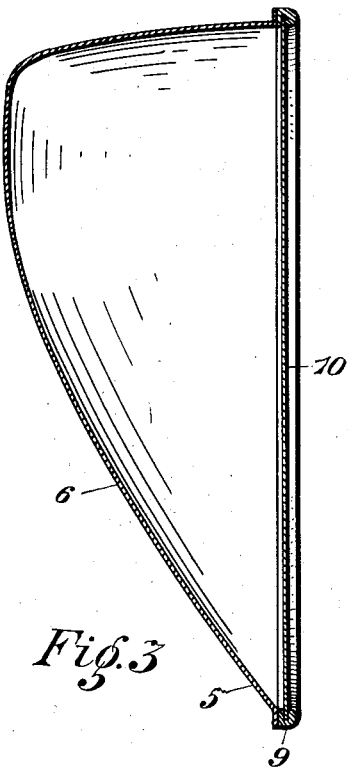
Fig. 3
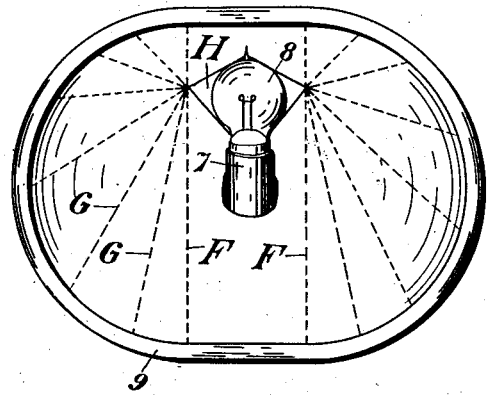
Fig. 6
INVENTOR.
J. J. WOMPEY
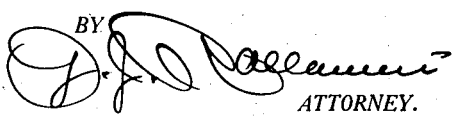
ATTORNEY.

Patented May 4, 1926.

1,583,216

UNITED STATES PATENT OFFICE.

JOHN J. WOMPEY, OF DENVER, COLORADO.

LIGHT REFLECTOR.

Application filed January 12, 1924. Serial No. 685,852.

*To all whom it may concern:*

Be it known that I, JOHN J. WOMPEY, a citizen of the United States, residing at Denver, in the county of Denver and State of Colorado, have invented certain new and useful Improvements in Light Reflectors, of which the following is a specification.

My invention relates to light reflectors and more particularly to reflectors of the type used in automobile headlights to illuminate the road forward of a vehicle to which they are attached.

It is an object of my invention to provide in a light of the before stated character, a reflecting surface which causes every ray emitted from a focal source of light to be deflected in a direction slanting downwardly from the horizontal, thereby eliminating the objectionable glare in the eyes of pedestrians or drivers of approaching vehicles and concentrating the light upon the roadway downwardly and forwardly in front of the vehicle.

Another object is to provide a reflecting surface in which certain groups of the reflected light rays are laterally directed to illuminate a comparatively wide space at opposite sides of the vehicle by wide angle distribution of the light rays, and a further object is to provide in a concave reflector having the above described distinctive features, a convexity rearward of the source of light which eliminates the glare usually caused by the proximity of the source to the reflecting surface, by deflecting the rays emanating rearwardly from the source in a lateral direction.

Still another object of the invention is to provide a reflector which by the downward deflection of the light rays in intersecting directions causes them to be broken up and diffused and thereby produces a widely distributed flood of light rather than a concentrated beam.

The above and other objects of the invention all of which will fully appear in the course of the following description, are attained by the peculiar curvature of a reflective surface and the distinctive arrangement of component sections of the same shown in the accompanying drawings in the several views of which like parts are similarly designated and in which—

Figure 1 represents a face view of an automobile headlight having a reflector made in accordance with my invention;

Figure 2, a vertical section taken in a central plane of the headlight along the line 2—2, Figure 1;

Figure 3, a similar section in a plane designated by the line 3—3 in Figure 1;

Figure 4, a horizontal section taken in the plane indicated by the lines 4—4 in Figures 1 and 2;

Figure 5, a front view of the headlight showing the application thereto of a glass front which is partially translucent to eliminate the glare ordinarily caused by the rays of light emanating directly forwardly from the source of light; and Figure 6, a front view of a headlight of horizontally oblong form but otherwise similar to that of the light shown in the other views, the object of which is to increase the angle of distribution of the light rays for the illumination of a comparatively broader transverse area forward of the vehicle.

The direction of the incident and reflected light rays produced in the operation of my invention, have been indicated in the drawings by lines and arrow heads and I desire it understood that while I am describing my invention as forming part of a headlight of the type used on locomotives, automobiles or other self-propelling vehicles, it is equally adapted for use in connection with other lamps of high illuminative power, as for example, those employed in light houses, search lights and show windows of large retail establishments.

Referring more specifically to the drawings, 5 designates a head light of circular form having a reflector 6 formed in accordance with the present invention as will hereinafter be explained in detail, 7 a lamp-socket extending through an opening of the reflector for the support of an incandescent bulb 8, 9 a rim at the forward circular edge of the reflector and 10 a pane of glass set in a groove of the rim to protect the reflector and the lamp from dust, dirt and moisture.

In the form of the invention illustrated in Figure 5, the upper portion of the glass directly opposite the incandescent bulb is preferably frosted as at 12 to eliminate the glare of light rays emitted forwardly directly from their source, as stated hereinbefore.

In the construction illustrated in the drawings, the rim 9 has been shown in direct connection with a shell which is pressed or otherwise formed from sheet metal, in conformity with the reflected surface and which is interiorly silvered or polished to the desired gloss. It will be apparent, however, that the shell may be set in a casing of the type usually employed in automobile headlights and fastened in a channeled rim at the forward edge of the casing together with the glass which covers the front of the same.

The reflecting surface comprises two concave side sections A identical in size and form and disposed at opposite sides of the source of light, and an intermediate section B which is curved in continuity with the others, the three sections forming together an upper zone C which overhangs the source of light in comparatively close proximity thereto and a lower zone D which flares downwardly and away from the source, and the two zones terminating in the circle which determines the forward edge of the reflector.

The sections A are parabolic surfaces the elements of which are parabolic curves which radiate from a point E of the imaginary vertical line F at which the section adjoins the intermediate section B of the reflector.

The parabolic curves indicated in Figures 1 and 6 by the lines G are longitudinally extended at progressively increasing lengths commencing with the curve which extends upwardly from the center point E in the inner boundary line F of the section and ending with the curve extending downwardly from the same point and in the same line, and they terminate in a circle in the plane of the front of the reflector.

The distance between the lines F which determine the inner boundaries of the side sections of the reflecting surface is proportionate to the width of the reflector at the forward edge thereof, as is illustrated in Figure 6 in which the extended parabolic curves G constituting the reflecting surface, terminate in an oval having its major axis horizontal to produce a wider angle of distribution of the light rays and thereby illuminate a proportionately broader transverse area.

The intermediate section B of the reflecting surface which provides a medium for connecting the partially parabolic side sections of the same in a continuous curve, has immediately rearward of the source of light a convexity H of substantially rhomboidal contour which functions to eliminate the glare of the forward reflection of the light rays emitted rearwardly from the source of light by directing the reflected rays laterally toward the side sections A of the reflector.

It will be observed that by the formation and arrangement of the co-ordinated assembled sections of the reflector every light ray emanated from the source of light is deflected in a direction slanting downwardly from the horizontal as clearly indicated by the lines I and K of the drawing which designate the directions of the incident and reflected rays, and that the rays emitted laterally from the source of light are deflected at a wide angle of divergence to cover a comparatively broad transverse area.

It will further be seen that owing to the peculiar form of the reflecting surface the reflected rays are directed in angular relation to each other so as to intersect one another, thereby breaking and diffusing the light beam forward of the reflector and producing a flood of light which greatly enhances the illuminative effect and is an important factor in the elimination of glare in the eyes of persons facing the headlight or other light projector to which the reflector is applied.

Having thus described my invention, what I claim and desire to secure by Letters Patent is:

1. A light reflector defining a front edge normally disposed in a vertical plane and having as component parts two like reflecting surfaces on opposite sides of the medial vertical plane, each of said surfaces being composed of substantially parabolic curves defining at one end a substantially semicircular portion of said front edge and terminating at the other end in a point, the two points in which the curves terminate lying in a plane which, passing through the horizontal diameter of the front edge, forms a substantial angle with the medial horizontal plane through the front edge.

2. A light reflector defining a front edge normally disposed in a vertical plane and having as component parts two like reflecting surfaces in symmetrically spaced relation to the medial vertical plane and an auxiliary reflecting surface inter-connecting the same, each of said like surfaces being composed of substantially parabolic curves defining at one end a substantially semicircular portion of said front edge and terminating at the other end in a point, the two points in which the curves terminate lying in a plane which, passing through the horizontal diameter of the front edge, forms a substantial angle with the medial horizontal plane through the front edge, and the auxiliary surface defining interconnecting portions of the front edge.

3. A light reflector according to claim 2, wherein the said semi-circular portions and the interconnecting portions together provide an oval front edge for the reflector.

4. A light reflector according to claim 2, wherein the auxiliary surface includes at the rear of the reflector a convex portion symmetrically disposed relatively to said medial vertical plane above the medial horizontal plane through the front edge.

5. In a head light, a light reflector defining a front edge normally disposed in a vertical plane and having as component parts two like reflecting surfaces in symmetrically spaced relation to the medial vertical plane and an auxiliary reflecting surface interconnecting the same, each of said like surfaces being composed of substantially parabolic curves defining at one end a substantially semi-circular portion of said front edge and terminating at the other end in a point, the two points in which the curves terminate lying in a plane which, passing through the horizontal diameter of the front edge, forms a substantial angle with the medial horizontal plane through the front edge, the auxiliary surface including at the rear of the reflector a convex portion disposed symmetrically to the said medial vertical plane above the medial horizontal plane through the front edge, and a source of light disposed in front of the convex portion.

In testimony whereof I have affixed my signature.

JOHN J. WOMPEY.